Aug. 8, 1933.                B. A. WITTKUHNS                1,921,982
                            REMOTE CONTROL SYSTEM
                            Filed March 6, 1930
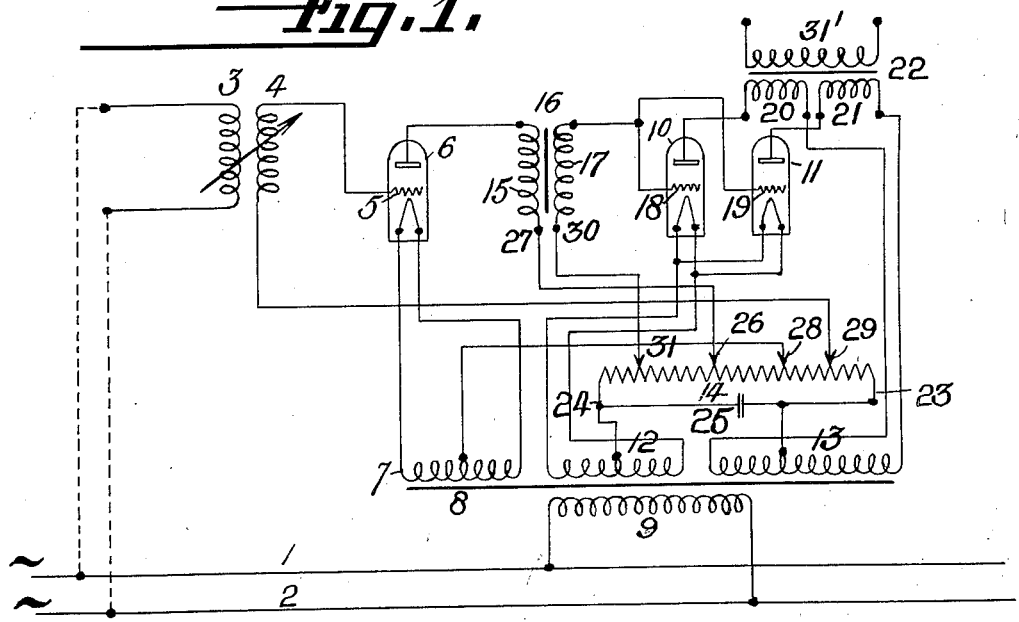
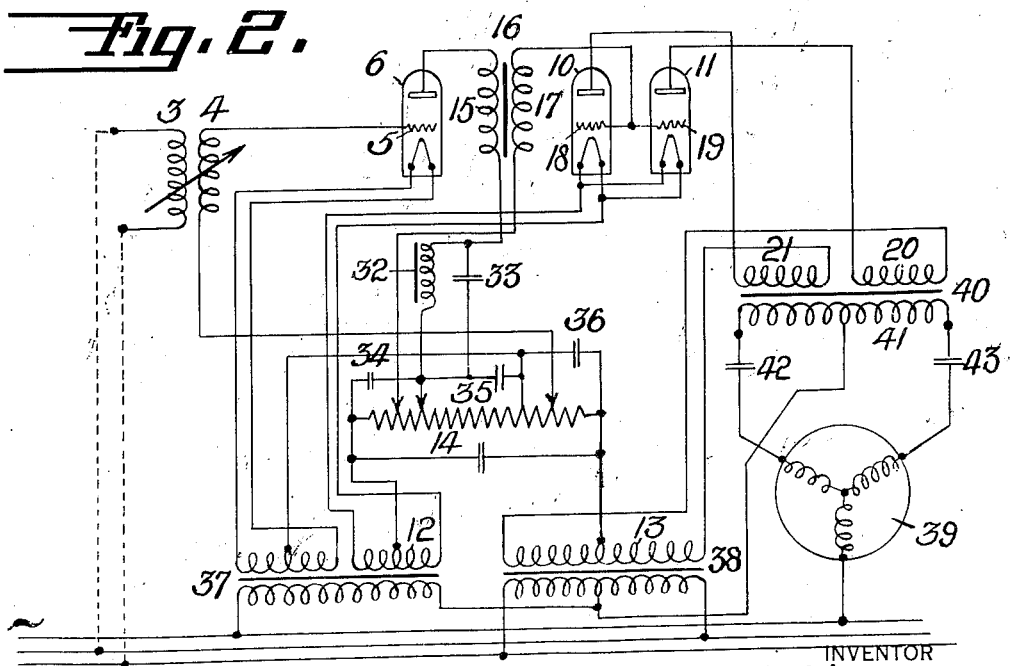
INVENTOR
BRUNO A. WITTKUHNS.
BY
Herbert H. Thompson
his ATTORNEY.

Patented Aug. 8, 1933

1,921,982

UNITED STATES PATENT OFFICE 1,921,982

REMOTE CONTROL SYSTEM

Bruno A. Wittkuhns, Chatham, N. J., assignor to Sperry Gyroscope Company, Inc., Brooklyn, N. Y., a Corporation of New York Application March 6, 1930. Serial No. 433,562

13 Claims. (Cl. 172—179)

This invention relates to improved and simplified means for the amplification for small alternating current impulses. It is especially adapted for remote control purposes and for all such cases where the indicating means is not able to transmit enough torque to effect the desired results, as for instance, if the indication of a delicate measuring instrument has to be used to control apparatus which in itself needs considerable power for operation.

This invention has special application for all such cases where the utmost simplicity and efficiency is required and where no supply of direct current is readily available for the operation of the amplifier proper. While direct current may be procured for such operations from an alternating source by the use of rectifying devices, such devices tend to complicate the amplifier and its component parts. They also make more parts and tubes necessary and represent in themselves a possible source of error and failure. I therefore have arranged my invention so that there is no necessity for a separate direct current supply no matter whether procured from a direct current source or by rectification, thereby making the whole circuit as simple as possible.

The main application of this invention relates especially to the amplification of alternating current impulses true to power factor and proportional to amplitude provided that the indicating impulse has the same frequency as the alternating current supply line. Changes of the phase of the input with relation to the phase of the alternating current line will therefore appear with exactly the same power factor across the output of the amplifier but with largely amplified amplitude. Therefore a change of the phase angle of the input will be duplicated without any change in the output circuit while a change of amplitude of the input impulse will appear amplified in the output circuit.

Referring to the drawing in which two preferred forms of my invention are shown:

Fig. 1 shows the general scheme of the amplifier on a single phase alternating current line.

Fig. 2 shows a special application of the same circuit on a 3-phase line for the control of a 3-phase alternating current motor.

Referring to Fig. 1, the alternating current supply line is represented by 1 and 2 and the input impulse may be introduced by a small transformer coil 3 which may be connected to the pivot of an electric measuring instrument (not shown) or other sensitive indicator and connected to the alternating current line in some manner which for the purpose of this invention is immaterial. The coil 4 represents the receiving end of the amplifier in which the impulse from coil 3 induces a corresponding impulse. The arrow through the two coils indicates that their relative position can be changed so as to effect a change of phase angle. It is obvious that if coil 3 is turned 180° in a plane vertical to the plane of the drawing, the phase in coil 4 is reversed. It is immaterial with respect to the purpose of this invention whether the indicating impulse is generated by inductive, capacitive, or other means well known to the art.

One end of the coil 4 is connected to the grid 5 of the three element vacuum tube 6. This vacuum tube has its filament heated by the center tapped winding 7 of the transformer 8, having its primary 9 connected to the alternating current line 1, 2. This same transformer 9 may also supply the heating current for the vacuum tubes 10 and 11 by means of the center tapped winding 12. It furthermore preferably supplies the plate potentials for all three tubes by a special arrangement, in which the high potential center tapped winding 13 generates the plate potential for tubes 10 and 11, the plate current of which creates a voltage drop across resistor 14, this voltage drop being used partly to supply the plate potential for tube 6.

The impulse induced in coil 4 will create an alternating current potential on the grid 5 of tube 6. By the well known action of a three element vacuum tube this alternating current potential will create a corresponding change in the plate current of tube 6, which in turn is put through the primary winding 15 of transformer 16. In the secondary winding 17 of this transformer, therefore, will be induced an alternating current potential in proportion to the change of current in the primary winding. This potential is again applied to the grids 18 and 19 of tubes 10 and 11. The plates of these two tubes are supplied with potential from the winding 13 in such a way that one end of the winding is connected to tube 10 and the other end to tube 11. The coils 20 and 21 of the output transformer 22 are each connected in series with the plate of one of each of the tubes so that the plate currents of the tubes have to pass through said coils.

It is well known that a three element vacuum tube will only show a large plate current if the plate is positive enough with respect to the filament. In my amplifier the plates of tubes 10 and 11 are supplied with alternating current potentials and therefore will act as rectifiers as well as amplifiers. The rectifying action allows plate current to flow only as long as the plate is positive, which means that only during one half of the alternating current cycle plate current can flow. Inasmuch as the tubes are connected to opposite ends of the high tension coil 13 the plate of tube 10 is positive while that of tube 11 is negative. This means that while a plate current will flow through tube 10, no current can flow through tube 11. During the next half cycle this condition will be reversed, the plate of tube 10 becoming negative with no current flowing, while the plate of tube 11 becomes positive thereby allowing plate current to flow. In order to complete the plate current circuit a connection is provided from the center point of coil 13 to the mid-point of the filament circuits of tubes 10 and 11. This connection is provided through the resistor 14, which at its terminal 23 is connected to the center point of coil 13 and at its terminal 24 to the center point of the heating coil 12. The resistor 14 therefore, during each half cycle of the alternating current wave, will carry the plate current of one of the tubes 10 or 11, these plate currents always flowing in the same direction through the resistor. The resistor therefore carries an intermittent direct current with a so-called alternating current "ripple" of twice the frequency of the original alternating current. By means of well known filtering devices this "ripple" can be smoothed out if necessary. I have shown the condenser 25 to indicate the filtering of the intermittent direct current.

The voltage drop across the resistor 14 provides a source of direct current potential for the plate of tube 6 and also for the grid bias potential for all tubes. It is well known that in order to work efficiently and symmetrically a three element vacuum tube has to be provided with an amount of negative grid potential sufficient to prevent the grid from becoming positive due to the change of the alternating current potential applied to the grid. The plate supply for the tube 6 is taken off the resistor 14 by means of the tap 26 which is connected to terminal 27 of transformer 16. In order to complete the plate circuit of this tube the center tap of the heating coil 7 is connected to the tap 28 on the resistor 14. For tube 6 the point 28 represents zero potential, point 26 being positive and point 29 being negative. It therefore is possible to use the voltage drop across the resistor 14 between points 28 and 23 as a source of negative grid potential for tube 6. I therefore connect the tap 29 to the second terminal of coil 4.

Regarding tubes 10 and 11, I use the same principle of potential drop across resistor 14 to obtain negative grid bias and therefore connect terminal 30 of the secondary 17 of transformer 16 to tap 31. Taps 31 and 29 can be chosen with respect to the load and the voltage amplification in order to insure symmetric and efficient work of the tubes.

In order to explain the action of the amplifier let us assume that we have an alternating current line with a frequency of 60 cycles. A very small input potential is created in coil 4 due to the action of coil 3, and this potential is applied to the grid 5 of tube 6. If the grid bias on this tube is at least as high as the maximum amplitude of the applied alternating current potential, the tube will amplify this impulse according to the well known action of any three element vacuum tube. In this case, during one half cycle of the alternating current the potential may be positive and therefore will reduce the bias, thereby enlarging the plate current. During the next half cycle the applied potential will be negative and add to the constant negative grid bias, thereby making the grid more negative and reducing the static plate current. The plate current, therefore, will fluctuate exactly the same way as the applied grid potential fluctuates, no matter what phase relation this potential has against the alternating current line. The transformer 16 will transform the current fluctuations of tube 6 into potential fluctuations, which in turn are applied simultaneously to tubes 10 and 11. Assuming again that the correct value of constant negative grid bias is applied to both tubes, they both will respond to the changes of actual grid potential in the same manner as tube 6 by a fluctuation of plate current.

However, each tube is active only during one half cycle of the alternating current, because their plates are supplied with alternating current potentials. Therefore, if we suppose that the incoming potential is positive during one half cycle and that during the same half cycle tube 10 has a positive potential on the plate and tube 11 a negative potential on the plate, only tube 10 will respond by enlarging its plate current due to the reduction of negative grid bias. Tube 11 will be inactive. During the next half period tube 11 has a positive plate potential while the incoming potential on the grid is negative, therefore the grid is becoming more negative and the static plate current of tube 11 will be greatly reduced while tube 10 is inactive. During one complete cycle of the alternating current we therefore have the effect of an enlarged plate current in tube 10 during the first half cycle and a reduced plate current in tube 11 during the second half cycle. The grid bias can be so chosen that the plate current in tube 11 is reduced to nearly zero while that in tube 10 is at its maximum value.

Until now we have assumed that the impulse in coil 4 is directly in phase with the alternating current line potential. The small phase differences which occur in the tubes and in the transformers can be corrected by well known means so that the output currents of tubes 10 and 11 are exactly in phase again with the alternating current line potential. Naturally in each tube and each transformer occurs a change of phase of 180°, but by reversing the leads to the input side of the transformer 16 it is easy to bring the phase to the desired position.

Now let us suppose that a change of phase occurs by changing the position of coil 3 180°. This will reverse the amplified potential all through the amplifier without effecting the original alternating current phase of the line. The only obvious change occurs in the tubes 10 and 11. Tube 10 now will have nearly zero plate current during the first half cycle while tube 11 has maximum plate current during the second half cycle.

If coil 3 is in a position of 90° to coil 4 there will be no impulse created in coil 4 because in that position the two coils are not coupled, therefore no impulse will get to tube 6 and no impulse to the tubes 10 and 11. Both will show their static plate current, which is about half the amount of maximum plate current if the static grid bias has been chosen correctly. During the first half cycle tube 10 will have its normal plate current and during the second half cycle tube 11 will have the same amount of normal plate current.

The changes of the plate current in tubes 10 and 11 effect the action of the output transformer 22. The two equally wound primary coils 20 and 21 are connected between the tubes and the ends of the high potential coil 13 in such a way as to cause the currents flowing in the same to magnetize the core of transformer 22 always in the same direction. Therefore if we again consider the last mentioned case where both tubes have the equal amount of plate current, the transformer becomes magnetized during the first half cycle by coil 20 and during the second half cycle by coil 21, each time in the same direction. Consequently the result will be that of an intermittent direct current or a full wave rectified alternating current flowing through one coil only. The secondary coil 31' of the transformer will therefore show no potential across its end, except for a small 120 cycle "ripple". But if we go back to the first considered condition where during the first half cycle tube 10 had a high plate current while during the second half cycle tube 11 has a zero plate current, the transformer will be magnetized only during one half cycle by coil 20 by one half of an alternating current wave. The transformer can be so designed that this intermittent magnetization of the primary coil will induce a somewhat distorted alternating current potential of 60 cycles in the secondary coil. Well known means would tend to prevent excessive distortion of the wave so that the output will be alternating current of 60 cycles of a very nearly sinoidal wave. If the phase of the input potential across coil 4 is changed 180° by the action of coil 3, the result in the output transformer will be that coil 21 now is the only one to magnetize the transformer during the second half of the cycle, resulting in an alternating current output of 60 cycles across the coil 31' which, however, also has changed its phase by 180°. Any intermediate position of coil 3 will therefore be represented in coil 31' as to cos. of the phase angle and amplitude whereby only the amplitude is subject to the amplification constants of the circuit.

The practical result of the change of phase for 180° of the input, therefore, is the same as if the wires leading from the terminals of coil 31' to the load would have been interchanged in the same way as could be done by a double pole double throw reversing switch.

One specific application of this general amplification scheme is shown in Figure 2, which shows how the amplifier can be used to control a 3-phase alternating current motor. The general principle has not been changed. The same kind of indicating device is shown and the arrangement of tubes and transformers also is identical. I show, however, a choke coil 32 and condensers 33, 34, 35 and 36 as further means of filtering the direct current supply taken from the resistor 14. I furthermore show two separate transformers 37 and 38 instead of one transformer 8. Of these transformers, 37 is the heating transformer and the other, 38 the high potential plate supply transformer. The primaries of these transformers are supplied from a 3-phase line and are connected to same and to each other in a way which is known in the art as a "Scott connection". This enables me to put a symmetrical load on the 3-phase line, at the same time giving me the possibility of supplying the motor 39 with 3-phase current. The output transformer 40 has again the same primary coils 20 and 21 but the output coil 41 has been tapped at its center. This center tap serves the purpose of another "Scott connection", the objective of which is this time the motor. One phase of the motor 39 is connected directly to one phase of the 3-phase line, while the other two terminals are connected to the output terminals of secondary coil 4 of the output transformer 40. Condensers 42 and 43 are employed to equalize irregularities of the phase transmission through the amplifier and to insure a balanced 3-phase supply to the motor 39.

As previously explained the action of the amplifier is identical to the action of a double pole double throw reversing switch connected to the output terminals of the output transformer. It therefore is obvious that if the primary coil 3 is turned through 180°, the two output terminals of the output transformer are reversed, resulting in a reversal of the motion of the motor 39. Turning the coil 3 through 90° will bring the motor 39 to a standstill as there will be no output from the transformer 40. The least deviation from this position of 90° of the coil 3 will result in an output through the output transformer 40 and will start the motor in the direction controlled by the deviation of coil 3. Feedback arrangements (not shown) by well known means of inductances, capacities or resistors can be used to make the amplifier as sensitive as desired so that a very small deviation of coil 3 will already result in maximum power output of transformer 40. In fact, a certain amount of feed-back action is obtained through the resistor 14 connected as shown in Figs. 1 and 2 since this common resistor is connected both to the output and first stage input.

The just described amplifier lends itself especially to remote control because the input circuit connected to coil 4 carries no current. Only a stationary potential is created and therefore the resistance of a long line of conductors between coil 4 and the grid 5 will not change the sensitivity of the arrangement.

Naturally other means of control can be designed instead of the two coils 3 and 4 but the action of the amplifier and its principle will not be changed thereby. It is also possible to employ transformers or inductances other than described. Furthermore bridge arrangements of inductances or resistances can be used, or the indication could come from a suitable arrangement of condensers, all of which modifications will readily suggest themselves to those skilled in the art.

Having described my invention, what I claim and desire to secure by Letters Patent is:

1. In an electron tube amplifier for controlling a motor from a weak current controller, a pair of output vacuum tubes, a plate supply transformer therefor, a connection from one terminal of the said controller to the girds of both tubes in parallel, means for supplying raw alternating current to the plates of said output tubes from opposite ends of a center tapped secondary of said plate supply transformer, and an output transformer having a plurality of primary windings, of which one is in circuit with the plate of one of said output tubes and with one half of said supply transformer winding, and another one is in circuit with the plate of the other of said output tubes and with the other half of said supply transformer winding, said windings being such that normally they magnetize the transformer core in the same direction whereby the secondary of the last-named transformer is only energized when the output of the tubes becomes unbalanced.

2. In a power amplifier, a pair of output electron tubes, a supply transformer, a resistor connected to a midpoint of the secondary thereof, a push-pull input transformer having no center tap, one output terminal being connected to the grids of both tubes in parallel and the other terminal to an intermediate point in said resistor, the opposite ends of said supply transformer impressing opposite alternating current potentials on the plates of said output tubes for obtaining characteristic push-pull action, said tapped resistor supplying negative grid bias.

3. In an impulse amplifying system of electron tubes, an alternating current supply, an input device, an electron tube connected thereto, a pair of push-pull amplifying tubes, a transformer excited from said supply having a plurality of secondary windings for supplying all plate potentials and heating currents to said tubes, including a high voltage center tapped secondary having opposite ends thereof connected to the plates of the push-pull tubes so as to cause said push-pull tubes to act simultaneously as amplifying and rectifying tubes, a resistor connected between said center tap and the electrical center of one of the secondary heater windings supplying the filaments of said push-pull tubes so that the plate currents of both push-pull tubes flow through said resistor always in the same direction.

4. In an impulse amplifying system of electron tubes, an alternating current supply, an input device, an electron tube connected thereto, a pair of push-pull amplifying tubes, an intermediate transformer, a transformer excited therefrom having a plurality of secondary windings for supplying all plate potentials and heating currents to said tubes, a resistor connected between the electrical center of a high potential plate supply winding for the push-pull tubes and the electrical center of the filament supply winding for said tubes, each of said push-pull tubes acting alternatingly with the other one as a half wave recifier and an amplifier, the rectified current flowing through said resistor causing a direct current voltage drop along same and a plurality of taps to said resistor, one of which provides a grid bias potential for the first vacuum tube, and another grid bias for said push-pull tubes, two other of said taps, one of which is connected to the electrical center of said secondary supply transformer winding, supplying the filament of the first tube and the other one being connected to the primary of said intermediate transformer, the potential drop between said two last named taps supplying the positive direct current plate potential to said first tube.

5. In a multistage electron tube power amplifying system, an electron tube amplifier stage, a second amplifier stage having two tubes, an alternating current supply transformer for the plates thereof, an output transformer having one primary winding in circuit with the plate of one tube of said second stage and said supply, and another primary winding in circuit with the plate of the other tube and said supply, the direction of the windings and the plate currents being such as to magnetize the core of said transformer unidirectionally, a tapped resistor through which both plate currents flow unidirectionally, the voltage drop along this resistor supplying direct current potentials to all stages.

6. In an electron tube power amplifying system the combination with an alternating current supply, of an amplifier stage comprising an input transformer having the secondary connected between the grids and the filaments of both tubes in parallel and an output transformer having a plurality of primaries connected in the plate circuits of said tubes, means powered by the same supply for impressing alternating currents of opposite potential on said plates through said primaries whereby feed-back connection is provided, and a common secondary for said primaries responsive only to variations in the relative strength and phase of said two primaries.

7. In a multistage electron tube audio frequency amplifier system, an alternating current supply transformer, means fed from said supply and having a plurality of secondary windings, an electron tube amplifier stage having a direct current plate potential, a push-pull input transformer without center taps, a push-pull amplifier stage of two tubes having opposite alternating current plate potentials supplied from the ends of one center tapped secondary of said supply transformer means, a resistor carrying the unidirectional plate currents of all tubes, a plurality of direct current potentials generated by the voltage drop in said resistor, one of said direct current potentials biasing the grid of said first mentioned tube, another biasing the grids of the push-pull amplifier tubes and another polarizing the plate of said first mentioned tube, a plurality of secondary windings of said supply transformer to supply alternating current to heat the tubes and output means connected in the plate circuits of said push-pull tubes.

8. In a multistage thermionic tube audio frequency amplifier, a multi-phase supply, a transformer excited from a phase thereof, a power amplifier stage comprising an input transformer without a center tap, two tubes with their grids and filaments in parallel and with their plates supplied with alternating current of opposite potentials from the ends of a center tapped secondary of said supply transformer winding, thereby causing said tubes to act in push-pull fashion, an output transformer having a plurality of primaries and a secondary, the two primaries being in series with the two plates and magnetizing their common core unidirectionally, the secondary combining the impulses of the primaries through the comon flux, producing an alternating current output of supply frequency but reversible phase relationship, and a polyphase motor driven in either of two directions from said supply and output.

9. In a multi-stage electron tube power amplifying system, an electron tube amplifier stage, a power amplifier stage having two tubes, an alternating current supply transformer for the plates thereof, an output transformer having one primary winding in circuit with the plate of one tube of said second stage and said supply, and another primary winding in circuit with the plate of the other tube and said supply, the direction of the windings and the plate currents being such as to magnetize the core of said transformer unidirectionally, a tapped resistor through which both plate currents are flowing unidirectionally, the voltage drop along this resistor supplying direct current potentials to all stages, and said resistor furnishing a feed-back means to said first stage.

10. In an impulse detecting and amplifying system of electron tubes, an alternating current supply, an input device, a pair of power amplifying tubes, a transformer excited from said supply having a plurality of secondary windings for supplying all plate potentials and heating currents to said tubes, including a high voltage center tapped secondary having opposite ends thereof connected to the plates of the tubes so as to cause said tubes to act simultaneously as amplifying and rectifying tubes, a resistor connected between said center tap and the electrical center of one of said secondary heater windings supplying the filaments of said tubes so that the plate currents of both tubes flow through said resistor always in the same direction.

11. In a multistage electron tube power amplifying system, an electron tube amplifier stage, a second amplifier stage having two tubes, an alternating current supply transformer for the plates thereof, an output transformer having one primary winding in circuit with the plate of one tube of said second stage and said supply, and another primary winding in circuit with the plate of the other tube and said supply, the direction of the windings and the plate currents being such as to magnetize the core of said transformer unidirectionally, a tapped resistor through which both plate currents are flowing unidirectionally, the voltage drop along this resistor supplying direct current potentials to all stages, said resistor thereby furnishing a feed back connection to said first mentioned electron tube.

12. A motor control electronic circuit for governing the speed and direction of a power motor comprising, in combination with the motor, an alternating current supply and a two-part controller having a reversible phase output energized from said supply, a secondary powered from said supply, a pair of electron tubes having their grids connected in parallel to said output and their plates connected to opposite ends of said secondary, means for deriving grid-biasing voltage for said tubes from the combined direct components of their plate currents, and means for separating from the said plate currents the combined alternating components thereof to drive said motor.

13. A motor control electronic circuit for governing the speed and direction of a three phase motor comprising, in combination with the motor, a three phase supply and a two-part controller having a reversible phase output energized from a phase of said supply, a secondary powered from the same phase of supply, a pair of electron tubes having their grids connected in parallel to said output and their plates connected to opposite ends of said secondary, means for deriving grid-biasing voltage for said tubes from the combined direct components of their plate currents, means for separating from the said plate currents the combined alternating components thereof, and means for splitting said output to drive said motor therefrom as combined with the third wire of said supply.

BRUNO A. WITTKUHNS.